United States Patent [19]
Kurose et al.

[11] Patent Number: 5,185,740
[45] Date of Patent: Feb. 9, 1993

[54] INFORMATION TRANSMITTING DEVICE

[75] Inventors: Yoshikazu Kurose; Shinji Aoki; Hideto Suzuki, all of Kanagawa, Japan

[73] Assignee: Sony Corporation, Tokyo, Japan

[21] Appl. No.: 555,769

[22] Filed: Jul. 23, 1990

[30] Foreign Application Priority Data
Jul. 26, 1989 [JP] Japan .................... 1-194769

[51] Int. Cl.⁵ .................... H04J 3/06; H04L 7/06; G06F 11/00
[52] U.S. Cl. .................... 370/106; 370/100.1; 375/108; 375/114; 371/42; 371/47.1; 360/32
[58] Field of Search .................... 370/100.1, 101, 103, 370/105.4, 106; 375/106, 108, 111, 112, 113, 114, 116; 371/37.1, 40.1, 40.2, 41, 42, 46, 47.1; 360/32, 36.1, 36.2, 37.1, 38.1, 39, 51; 358/335, 336, 337, 339; 328/72, 75, 155

[56] References Cited
U.S. PATENT DOCUMENTS

| | | | |
|---|---|---|---|
| 4,275,466 | 6/1981 | Yamamoto | 375/108 |
| 4,525,840 | 6/1985 | Heinz et al. | 375/114 |
| 4,613,979 | 9/1986 | Kent | 375/108 |
| 4,694,473 | 9/1987 | Etoh | 375/114 |
| 4,862,443 | 8/1989 | Tsuji et al. | 375/108 |

Primary Examiner—Douglas W. Olms
Assistant Examiner—Alpus H. Hsu
Attorney, Agent, or Firm—Alvin Sinderbrand; William S. Frommer

[57] ABSTRACT

In an information transmitting device which transmits information in a preamble portion and a plurality of data blocks as a unitary set, when a block synchronizing code in the data blocks is detected, the timing of the detection and the block synchronizing code are determined to be correct or are subjected to error correction, and are utilized to reproduce information contained in the preamble portion.

4 Claims, 5 Drawing Sheets

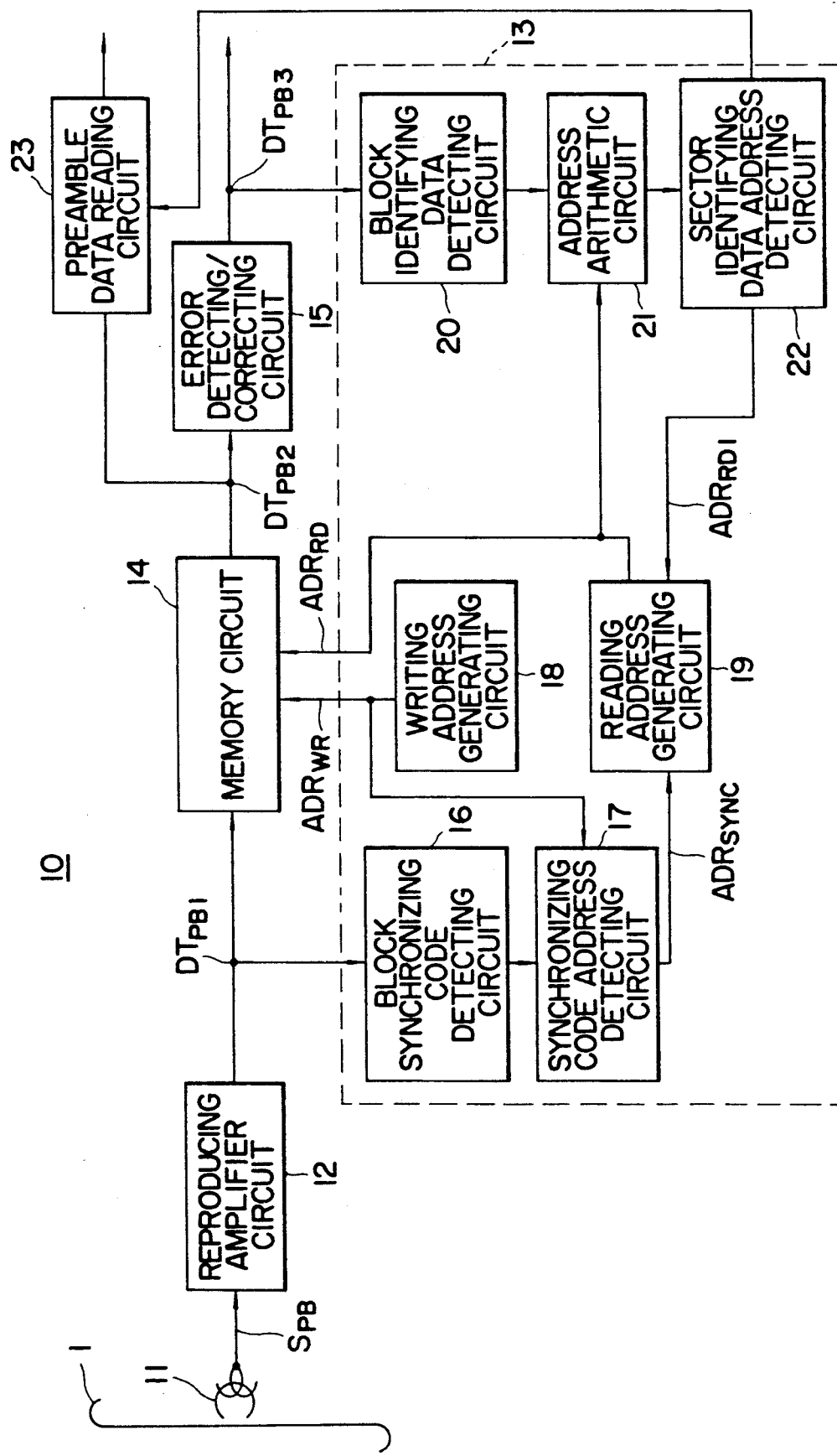
F I G. 1

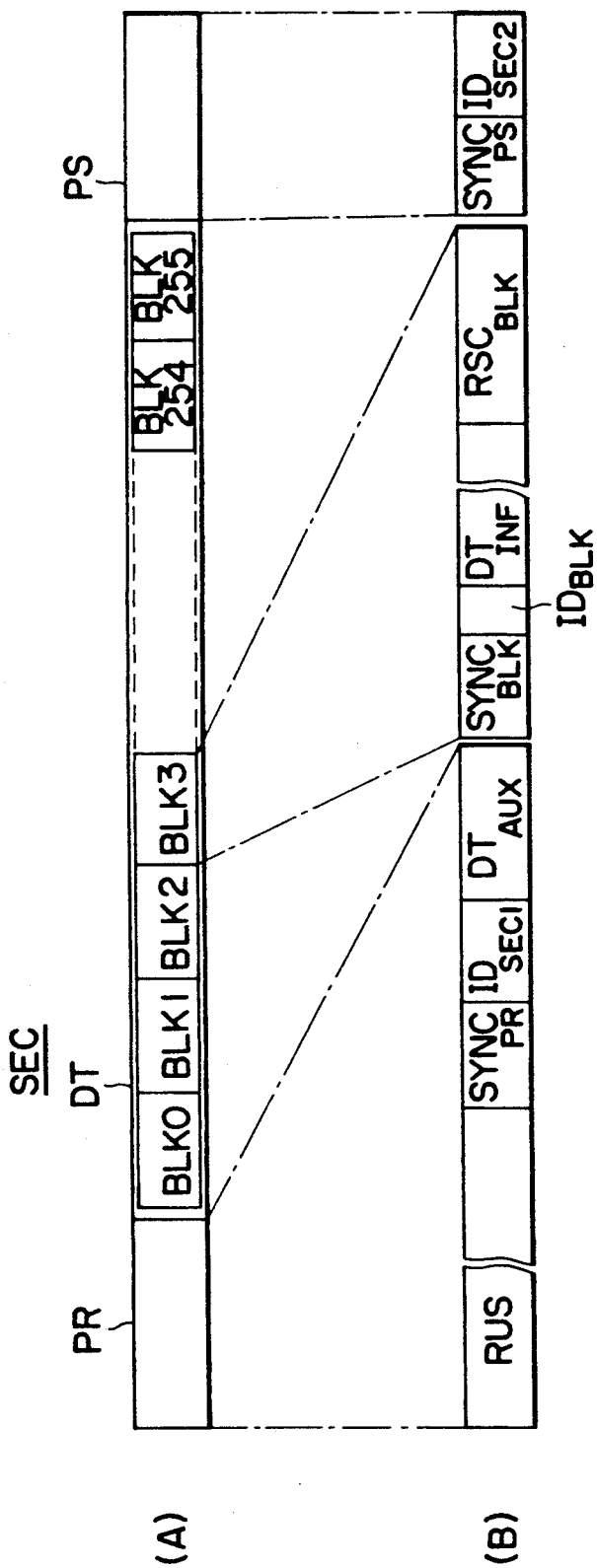
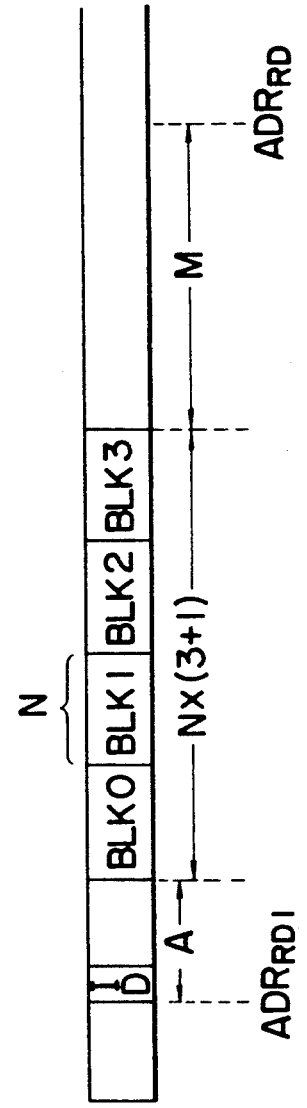
FIG. 4
FIG. 5

INFORMATION TRANSMITTING DEVICE

BACKGROUND OF THE INVENTION

This invention relates to information transmitting devices, and more particularly is directed to an information transmitting device which is applicable to devices which are designed as to record and reproduce desired information data on a magnetic tape.

An example of a conventional information data recording and reproducing device which records information data with high density is a so-called "ANSI ID-1 format" (Third Draft PROPOSED AMERICAN NATIONAL STANDARD 19 mm TYPE ID-1 INSTRUMENTATION DIGITAL CASSETTE FORMAT X3B6/88-12 Project 592-D 1988-03-22) magnetic recording and reproducing device. The ANSI ID-1 device records and reproduces desired information data, in contrast to the digital video data and digital audio data of a so-called "SMPTE D-1 format" digital video tape recorder (digital VTR) which records component digital video signals on a magnetic tape.

In a magnetic recording and reproducing device, as shown in FIG. 3, a magnetic tape 1 has a time code track TC and a control track CTL which are extended longitudinally along the lower edge of the magnetic tape 1. The time code track TC is used for editing, and the control track CTL is used for tracking control. A magnetic head helically scans the magnetic tape 1 obliquely, thus forming recording tracks TR (..., TR1, TR2, TR3, TR4, ...) which alternately differ in their azimuth angles.

In practice, each recording track TR corresponds to one sector, SEC, or record unit, as shown in FIG. 4, and is comprised of a preamble part PR, a record data part DT, and a postamble part PS.

The preamble part PR includes a rise sequence RUS 20 bytes in length in which is written a clock signal for the phase-lock loop (PLL) circuit in a read circuit, a synchronizing code $SYNC_{PR}$ 4 bytes in length, sector identifying data $ID_{SEC1}$ 4 bytes in length, and extended data $DT_{AUX}$ 6 bytes in length which is provided for user data.

The record data part DT consists of 256 data blocks BLK (BLK0, BLK1, BLK2, ..., and BLK255). Each data block BLK includes a block synchronizing code $SYNC_{BLK}$ 4 bytes in length, block identifying data $ID_{BLK}$ 1 byte in length, information data $DT_{INF}$ 153 bytes in length, and a Reed-Solomon code $RSC_{BLK}$ 8 bytes in length for error detection and correction of block identifying data $ID_{BLK}$ and information data $DT_{INF}$.

The postamble part PS consists of a synchronizing code $SYNC_{PS}$ 4 bytes in length, and sector identifying data $ID_{SEC2}$.

When using the magnetic recording and reproducing device, it is necessary to reproduce the 4-byte sector identifying data $ID_{SEC1}$, and the 6-byte extended data $DT_{AUX}$ in the preamble part PR prior to reproducing the information data $DT_{INF}$ recorded in the record data part DT.

For this purpose, the 4-byte synchronizing code $SYNC_{PR}$ succeeding the 20-byte rise sequence RUS is usually detected, and then using the time of such detection as a reference, the following 4-byte data and 6-byte data are reproduced as the sector identifying data $ID_{SEC1}$ and the extended data $DT_{AUX}$, respectively.

Consequently, it is essential to correctly detect the synchronizing code $SYNC_{PR}$ in the preamble part PR. If that synchronizing code is not correctly detected, then it will be difficult to reproduce the sector identifying data $ID_{SEC1}$ and the extended data $DT_{AUX}$.

In practice, in each record track TR, the preamble part PR is the location where the helically scanning magnetic head comes into contact with the magnetic tape. Hence, the preamble part PR has a higher probability than the data record part DT located in the middle of the tape 1 of experiencing a tracking or other error.

The ratio of the byte length of the synchronizing code $SYNC_{PR}$ to the byte length of the entire preamble part PR is 4/14. When an error occurs within the preamble part PR, it is more likely than not that such error will occur at the beginning thereof where the synchronizing code $SYNC_{PR}$ is situated; that is, the probability is high that, in the event of an error in the preamble part PR, the synchronizing code $SYNC_{PR}$ is not correctly detected. In such case, the sector identifying data $ID_{SEC1}$ and the extended data $DT_{AUX}$ are frequently detected incorrectly.

Even if the synchronizing code $SYNC_{PR}$ of the preamble part PR is correctly detected, its correctness cannot be determined because no error detecting/correcting code is employed. Therefore, the erroneous part may be detected as the synchronizing code $SYNC_{PR}$, and this in turn increases the probability is increased as much that the sector identifying data $ID_{SEC1}$ and the extended data $DT_{AUX}$ are erroneously reproduced.

In order to overcome this problem, a method has been proposed in which, if an error occurs in reading the sector identifying data from a sector, but the preceding sectors are correct, then it is assumed that the sector in question is also correct (Japanese Patent Application Laid-open No. 251564/1985).

However, the above-mentioned method may cause a serious error in the reproduction of information; that is, it is still insufficient to solve the above-described problem.

OBJECTS AND SUMMARY OF THE INVENTION

In view of the foregoing, it is an object of the present invention to provide an information transmitting device which, when the synchronizing code in a preamble part cannot be detected, never-the-less ascertains, the position of the preamble part by using a block synchronizing code which is obtained from the data block part through detection or correction, whereby information is obtained more accurately.

The foregoing and other objects of the present invention have been achieved by the use of an information transmitting device which transmits, as a unitary sector, at least a preamble part including at least a synchronizing code and preamble data, as well as a predetermined number of data block parts, each of which includes at least a block synchronizing code, block identifying data and information data. According to the invention, the block synchronizing codes are transmitted in succession to the preamble part and are detected. Then, information on the block synchronizing code is detected by using the time of the detection as a reference. The time of the detection is utilized to reproduce and read the position of the preamble part.

The present invention further provides an information transmitting device which transmits as a unitary sector at least a preamble part which includes at least a synchronizing code and preamble data, and a predetermined number of data block parts, each of which includes at least a block synchronizing code, block identifying data, information data, and an error correcting code for the block identifying data and information data. According to the invention, when the block synchronizing codes in the predetermined number of synchronizing block parts transmitted in succession to the preamble part are detected, the block identifying code which is detected at the time of the detection serves as a reference and is subjected to error correction according to the error correcting code. The information on the block identifying code is correctly detected, the time of the detection is utilized to reproduce and read the position of the preamble data.

The nature, principle and utility of the present invention will become more apparent from the following detailed description when read in conjunction with the accompanying drawings, in which like parts are designated by like reference numerals or characters.

BRIEF DESCRIPTION OF THE DRAWINGS

FIG. 1 is a block diagram showing the arrangement of a magnetic recording and reproducing device in accordance with one embodiment of the present invention;

FIG. 4 is an explanatory diagram showing the contents of recording tracks on the magnetic tape;

FIG. 5 is an explanatory diagram showing one example of a method for obtaining a read address $AD_{RDI}$ when the time of detection is correctly determined.

DETAILED DESCRIPTION OF THE INVENTION

Figure 2:
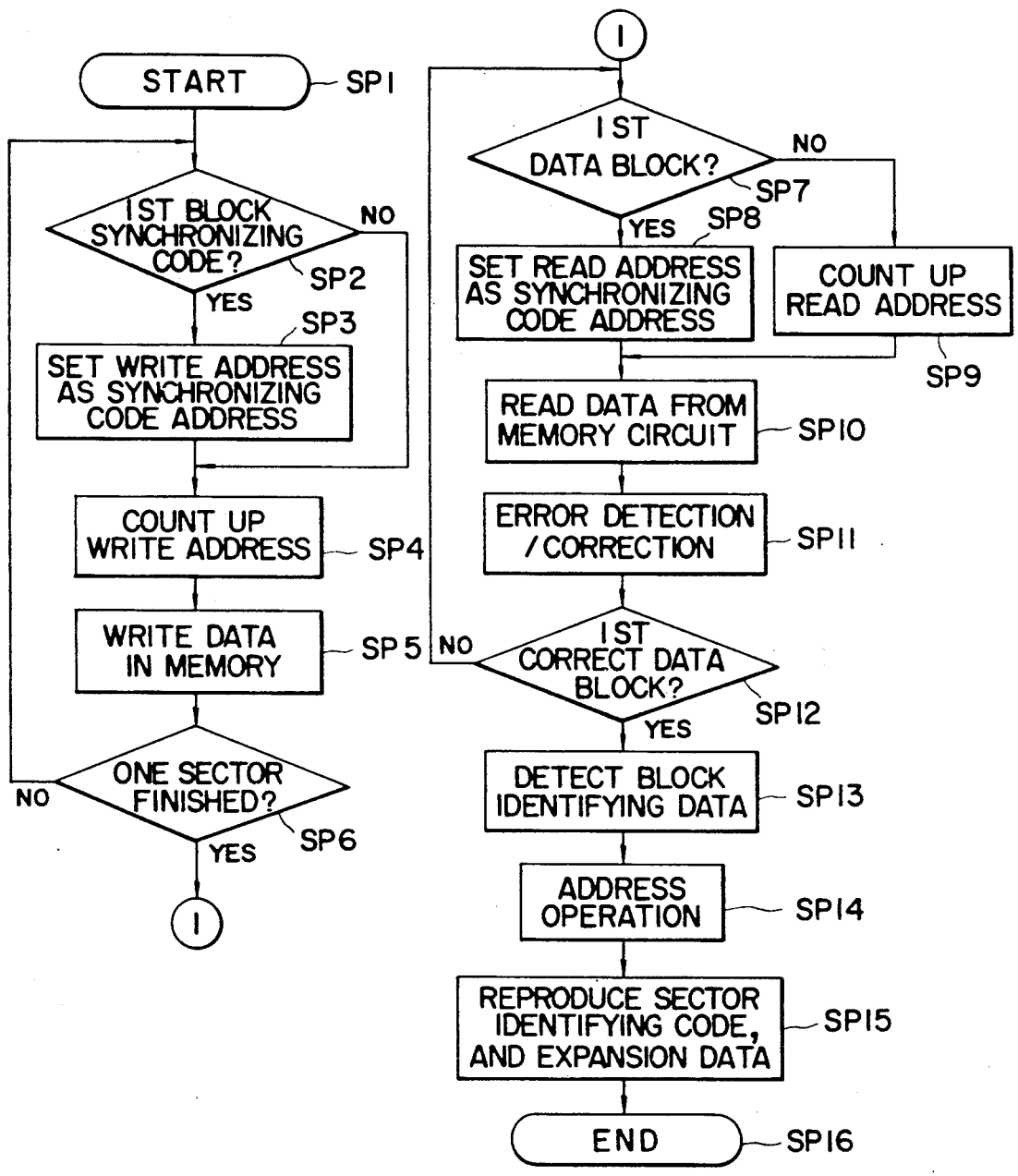
FIG. 2 is a flow chart illustrating the data processing operation of the magnetic recording and reproducing device.
Figure 3:
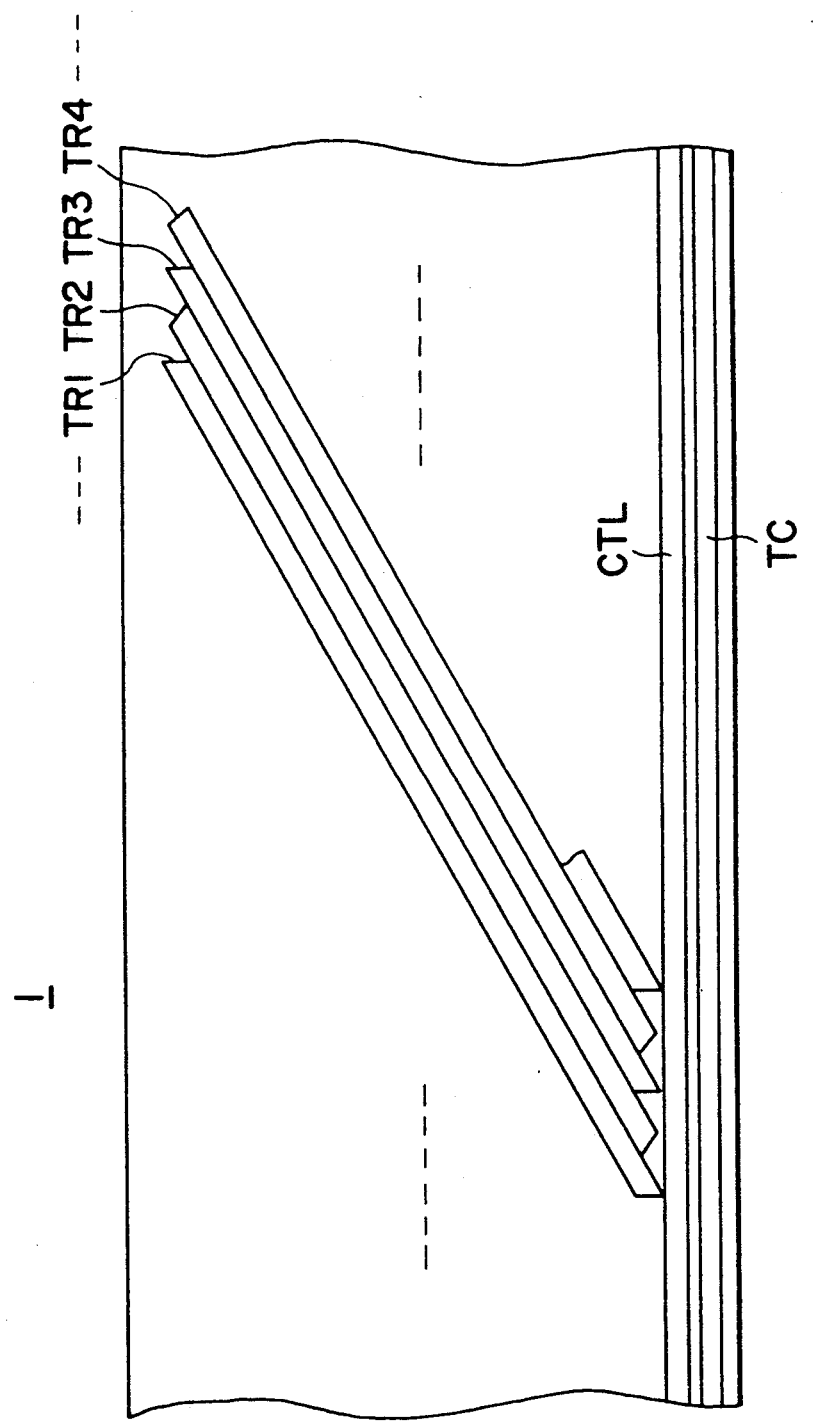
FIG. 3 is an explanatory diagram outlining a recording format on a magnetic tape employed in the magnetic recording and reproducing device.

Preferred embodiments of the present invention will now be described with reference to the accompanying drawings.

In FIG. 1, reference numeral 10 generally designates the reproduction system of an information transmitting device according to the invention. A magnetic head 11 helically scans a magnetic tape 1 outputs a reproducing signal $S_{PB}$. The reproducing signal $S_{PB}$ is applied to a reproducing amplifier circuit 12 which may conventionally include an equalizer circuit and a PLL type binary coding circuit (not shown) which outputs first reproducing digital data $DT_{PB1}$ of a sector SEC. The first reproducing digital data $DT_{PB1}$ thus outputted are written for every sector SEC at predetermined addresses in a RAM (random access memory) memory circuit 14 in response to a writing address $ADR_{WR}$ provided by a memory control circuit 13.

The first reproducing digital data $DT_{PB1}$ thus written are read out of the memory circuit 14 as second reproducing digital data $DT_{PB2}$ in response to a reading address $ADR_{RD}$ provided by the memory control circuit 13. The second reproducing digital data $DT_{PB2}$ are transmitted to a preamble data reading circuit 23 which is adapted to read preamble data from the preamble part; i.e. sector identifying data $ID_{SEC1}$ and expansion data $DT_{AUX}$. The second reproducing digital data $DT_{PB2}$ are also applied to an error detecting/correcting circuit 15 which performs error detection and correction according to Reed-Solomon codes. After the second reproducing digital data $DT_{PB2}$ are subjected to error correction, they are transmitted as third or corrected reproducing digital data $DT_{PB3}$.

In practice, the memory control circuit 13 comprising a CPU (not shown) receives the first reproducing digital data $DT_{PB1}$ from the reproducing amplifier circuit 12 and receives the third or corrected reproducing digital data $DT_{PB3}$ from the error detecting/correcting circuit 15. The CPU is designed so that it executes various operations according to a sector identifying data and extended data reproducing program shown in FIG. 2, and which ensures that even when the synchronizing code $SYNC_{PR}$ of the preamble part PR is not detected, the sector identifying data $ID_{SEC1}$ and the extended data $DT_{AUX}$ will be positively reproduced.

The first reproducing digital data $DT_{PB1}$ are applied to a block synchronizing code detecting circuit 16 which is adapted to detect the block synchronizing code $SYNC_{BLK}$ of each data block BLK in the memory control circuit 13. The result of such detection, that is, the output of the block synchronizing code detecting circuit 16, is applied to a synchronizing code address detecting circuit 17.

The writing address $ADR_{WR}$ produced by a writing address generating circuit 18 is applied to the synchronizing code address detecting circuit 17. The circuit 17 detects the writing address $ADR_{WR}$ at the time of detection of the block synchronizing code $SYNC_{BLK}$ of the data block BLK, and applies it, as a synchronizing code address $ADR_{SYNC}$, to a reading address generating circuit 19.

The third reproducing digital data $DT_{PB3}$ is applied to a block identifying data detecting circuit 20 adapted to detect the block identifying data $ID_{BLK}$ of each data block BLK in the memory control circuit 13. The result of such detection, that is, the output of circuit 20, is applied to an address arithmetic circuit 21.

Based on the reading address $ADR_{RD}$ provided by the reading address generating circuit 19, the address arithmetic circuit 21 calculates the addresses of the sector identifying data $ID_{SEC1}$ and the extended data $DT_{AUX}$ from the address of the block identifying data $ID_{BLK}$. The result of the calculation is applied to a sector identifying data address detecting circuit 22. The sector identifying data address detecting circuit 22, after data of one sector is read out of the memory circuit 14, sets in the reading address generating circuit 19 the address $ADR_{RDI}$ in the memory circuit 14 from which the preamble data $ID_{SEC1}$ and expansion data $DT_{AUX}$ are calculated. Simultaneously, the sector identifying data address detecting circuit 22 applies a signal to the preamble data reading circuit 23 to inform the latter of the time at which preamble data are read out of the memory circuit 14. In response to the output $ADR_{RD}$ of the reading address generating circuit 19, the preamble data are read out of the memory circuit 14, and are applied to the preamble data reading circuit 23.

FIG. 2 illustrates an operating program of the above-described arrangement. Following the start of such program in a step SP1, the first reproducing digital data $DT_{PB1}$ is applied, in step SP2, to the memory control circuit 13 which employs the sector identifying data and extended data reproducing program determine whether or not the first reproducing digital data $DT_{PB1}$ are the block synchronizing code $SYNC_{BLK}$ of the data block BLK which was first detected by the block synchronizing code detecting circuit 16.

When the result of the determination is Step SP2 is "YES", then in Step SP3 the CPU or memory control circuit 13 stores the present writing address $ADR_{WR}$ as the synchronizing code address. Accordingly, in Step SP4 the CPU increments the writing address $ADR_{WR}$, provided by the writing address generating circuit 18, and writes the first reproducing digital data $DT_{PB1}$ in the memory circuit 14 at an address corresponding to the writing address $ADR_{WR}$.

When the result of the determination in Step SP2 is "NO", then the CPU by-passes step SP3 and proceeds directly to the operations of steps SP4 and SP5 in sequence.

Next, in Step SP6, the CPU determines whether or not the inputting of data has been completed for at least one sector. When the result of determination in step SP6 is "NO", the program returns to step SP2, so that the CPU again executes the operations of Steps SP3, SP4, SP5 and SP6.

When in Step SP6 the result of the determination is "YES", then in Step SP7 the CPU determines whether or not the processing is for the first synchronizing block BLK. When the result of the determination in step SP7 is "YES", in Step SP8 the synchronizing code address stored in Step SP3 is set as the reading address $ADR_{RD}$ of the reading address generating circuit 19, and then Step SP10 is effected.

When the result of the determination in step SP7 is "NO", Step SP9 is effected so that the CPU increments the reading address $ADR_{RD}$ of the reading address generating circuit 19.

Thereafter, in Step SP10, the CPU reads the content of the memory circuit 14 according to the reading address $ADR_{RD}$ to provide the second reproducing digital data $DT_{PB2}$. Then, in Step SP11, the CPU causes the error detecting/correcting circuit 15 to perform an error detecting and correcting operation. In Step SP12, the CPU determines whether or not the result from the error detecting and correcting operation is the data block BLK with which correct block identifying data has been detected. If the result of the determination in step SP12 is "NO", then the program returns to Step SP7; that is, the CPU again executes the operations of Steps SP7, SP8 (SP9), SP10, SP11 and SP12.

If the result of the determination in Step SP12 is "YES", then Step SP13 is effected, so that the block identifying data $ID_{BLK}$ are detected by the block identifying data detecting circuit 20. Thereafter, in Step SP14, an arithmetic operation is performed according to the following equation (1), and the addresses in the memory circuit 14 where the sector identifying data $ID_{SEC1}$ and the extension data $DT_{AUX}$ have been written are read out to provide a reading address $ADR_{RD1}$:

$$ADR_{RD1} = ADR_{RD} - N \times (ID_{BLK}+1) - M - A \quad (1)$$

In the above equation (1), N is the number of words of a synchronizing block BLK, M is the period of time required for the error detecting and correcting operation, and A is the period of time corresponding to the distance between the top of the first data block BLK and the sector identifying data $ID_{SEC1}$ in the preamble part PR. In practice, the block identifying data $ID_{BLK}$ are provided with a value i (=0, 1, 2, ... 255), which represents the position thereof from the top data block BLK.

For example, let us consider the case where, as shown in FIG. 5, correct block identifying data $ID_{BLK}$ are detected from the data block BLK3. In this case, the block identifying data $ID_{BLK}$ of the data block BLK3 are correctly determined at a period of time M, where M is the period of time required for the error detecting/correcting operation, after the data from data block BLK3 have been read out of the memory circuit 14. With the read address $ADR_{RD}$ in this operation employed as a reference, the read address $ADR_{RD1}$ corresponding to the top of the sector identifying data $ID_{SEC1}$ of the preamble part can be obtained from the following equation (2) which is obtained by substituting ($ID_{BLK}=3$) in the above-described equation (1):

$$ADR_{RD1} = ADR_{RD} - N \times (3+1) - M - A \quad (2)$$

Thereafter, in Step SP15 of FIG. 2, the CPU sets the reading address $ADR_{RD1}$ in the reading address generating circuit 19, and accesses to the memory circuit 14 on the basis of the reading address $ADR_{RD1}$ in order to reproduce the sector identifying data $ID_{SEC1}$ and the extended data $DT_{AUX}$ as the second reproducing digital data $DT_{PB2}$. Then, in Step SP16, the sector identifying code and extended data reproducing program is ended.

As described above, the magnetic recording and reproducing device 10 is designed so that the block synchronizing code $SYNC_{BLK}$ in a data block BLK of the record data part DT which follows the preamble part PR is detected, and the data block BLK is subjected to error correction according to the error correcting code $RSC_{BLK}$. Thus, by calculating back from the data block BLK, and in particular from the block identifying code $ID_{BLK}$ which is first correctly detected, the sector identifying data $ID_{SEC1}$ and the extended data $DT_{AUX}$ of the preamble part PR are detected. Hence, even if the first synchronizing code $SYNC_{PR}$ of the preamble part PR is not detected, the sector identifying data $ID_{SEC1}$ and the extended data $DT_{AUX}$ can still be positively detected.

Figure 6:
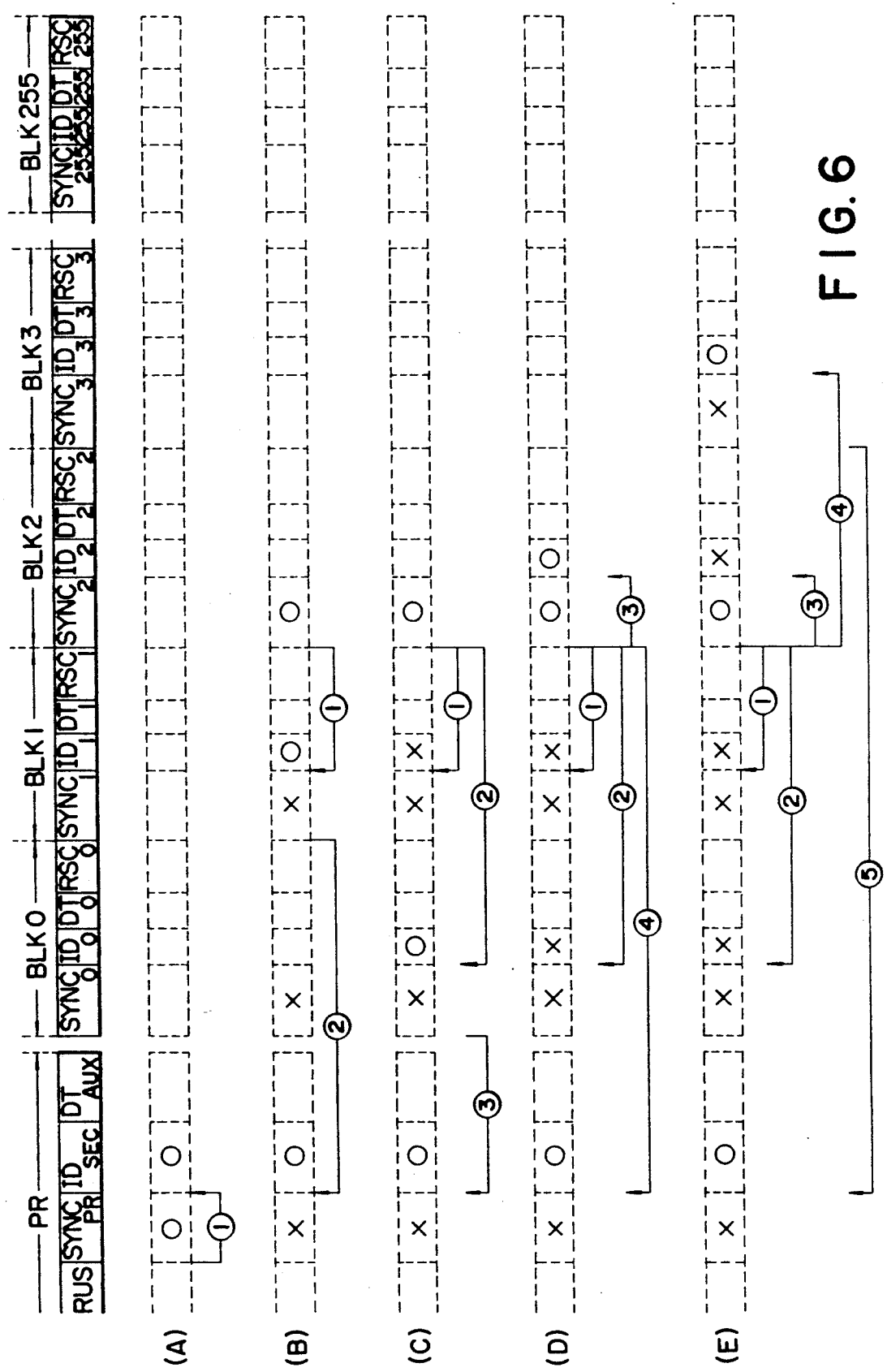
FIG. 6 is an explanatory diagram illustrating a search operation under a plurality of search conditions.

The above-mentioned operations will now be further described with reference to FIG. 6. As shown in FIG. 6, one sector is made up of the preamble part PR and 256 data blocks, BLK0 through BLK255, each consisting of the block synchronizing code SYNC, the block identifying code ID, the information data DT and the error correction code RSC. Here, for simplification purposes, the data processing time and the like will be disregarded.

Part (A) of FIG. 6 shows the case where the synchronizing code $SYNC_{PR}$ of the preamble part PR is detected. At the time of this detection, preamble data such as the sector identifying code $ID_{SEC}$ can be read, as in accordance with the prior art.

Next, let us consider the case shown in part (B) of FIG. 6 where the synchronizing code $SYNC_{PR}$ of the preamble part PR cannot be detected, and the block synchronizing code SYNC is detected for the first time at the third data block BLK2. In this case, the CPU reads the block identifying code $ID_1$ of the second data block BLK1 at the time of the detection of the block synchronizing code $SYNC_{BLK2}$ of the data block BLK2. During this operation, the CPU performs an error correcting operation using the error correcting code $RSC_1$. When it is determined that the block identifying code $ID_1$ is correct, the CPU calculates the position of the address of the top of the preamble data according to the above-described equation (1) using the position of the top of the data block BLK1 as a reference, whereby the sector identifying code $ID_{SEC}$ can be read.

Part (C) of FIG. 6 shows the case where the block identifying code $ID_1$ is determined to be incorrect as a result of the error correcting operation. As in part (B) above, the CPU searches for the block identifying code $ID_0$ of the data block BLK0 using the time of the detection of the block synchronizing code $SYNC_2$ as a reference. Then, the CPU performs an error correction operation using the error correcting code $RSC_0$. When, as a result, the block identifying code $ID_0$ is correctly determined, the CPU reads the sector identifying code $ID_{SEC}$ of the preamble part PR by using the position of the top of the data block BLK0 as a reference.

Part (D) of FIG. 6 shows a case in which the block identifying codes $ID_0$ and $ID_1$ are both read incorrectly, but the block identifying code $ID_2$ is correctly detected at the time of the detection of the block synchronizing code $SYNC_2$, whereupon, a search is conducted for the sector identifying code $ID_{SEC}$ using the position of the top of the data block BLK2 as a reference.

In the case of parts (B) and (C) of FIG. 6, when the block synchronizing code $SYNC_2$ is detected, the following method may be employed. First, the block identifying code $ID_2$ is read, and an error correction is performed. If the block identifying code $ID_2$ is incorrectly detected, a search is then conducted for either the block identifying code $ID_0$ or $ID_1$ of the data block BLK0 or BLK1, respectively. In this case, the order of preference for selection of the block identifying codes $ID_0$ and $ID_1$ may be determined optionally.

Part (E) of FIG. 6 shows a case in which a search by the CPU incorrectly detects the block identifying codes $ID_1$, $ID_0$ and $ID_2$ with the time of the detection of the block synchronizing code $SYNC_2$ used as a reference. Using block synchronizing code $SYNC_2$ as a reference, the block identifying code $ID_3$ of the block code BLK3 is correctly detected for the first time. In this case, the position of the sector identifying code $ID_{SEC}$ is calculated by using the position of the top of the data block BLK3 as a reference.

In the above-described cases shown in FIG. 6, the position of the data of the preamble part is detected using, as a reference therefor the position of the top of the data block which includes the first block identifying code which has been correctly detected. However the invention is not limited thereto. For instance, in the case of part (E) of FIG. 6, after the block identifying code $ID_3$ is correctly detected, the value obtained by subtracting one (1) from the value of the block identifying code $ID_3$ may be used instead of the block identifying code $ID_2$, and then the position of the top of the data block BLK2 is used as the reference time for calculating of the position of the preamble data.

In other words, by calculating back from the data block BLK which is first correctly detected as a the result of the error detection and correction operation, the sector identifying data $ID_{SEC1}$ and the extended data $DT_{AUX}$ can be detected. Hence, a magnetic recording and reproducing device can be realized according to this invention in which the sector identifying data $ID_{SEC1}$ and the extended data $DT_{AUX}$ can be reproduced positively, even when the synchronizing code $SYNC_{PR}$ of the preamble part PR cannot be detected.

In the above-described embodiment, the sector identifying data $ID_{SEC1}$ and the extended data $DT_{AUX}$ in the preamble part PR are detected on the basis of the information of the block identifying code which has been correctly detected as a result of the error detecting/correcting operation. However, the device may be designed so that, by calculating back from the synchronizing block which has been detected before the error detection and correction operation, the sector identifying data $ID_{SEC1}$ and the extended data $DT_{AUX}$ of the preamble part PR can be detected.

In the latter case, the magnetic recording and reproducing device can be greatly simplified in its arrangement and in its reproducing operation.

Furthermore, in the above-described embodiment, the sector identifying data and the extended data are both reproduced as the preamble data. However, the same effects can be obtained by reproducing only the sector identifying data or the extended data.

Although the present invention has been described with reference to the ANSI ID-1 format type magnetic recording and reproducing device, it should be noted that the invention is not limited thereto. In particular, the technical concept of the invention can be widely applied to the reproduction of a recording medium in which a sector is recorded as in the above-described format. In addition, the technical concept of the invention is applicable not only to signal recording and reproducing devices, but also to other information transmitting devices such as wire or wireless communication means.

Although a preferred embodiment of this invention and a number of modifications thereof have been described in detail herein, it will be understood that the invention is not limited thereto, and that various changes and modifications can be effected therein by one skilled in the art without departing from the scope or spirit of the invention as defined in the appended claims.

What is claimed is:

1. In an information transmitting apparatus for transmitting a plurality of sets of information signals, wherein each of said sets includes a preamble portion and a plurality of data blocks following said preamble portion, said preamble portion containing preamble data at a predetermined position in the preamble portion and each of said data blocks containing at least a block synchronizing code, a block identification code and information data, a device for locating the position of said preamble data, comprising:

means for detecting said block synchronizing code;
   means for locating said block identification code on the basis of a time at which said block synchronizing code was detected;
   means for reading said located block identification code; and
   means for determining the position of said preamble data on the basis of the block identification code which is read and said time at which said block synchronizing code was detected.

2. In an information transmitting apparatus for transmitting a plurality of sets of information signals, wherein each of said sets includes a preamble portion and a plurality of data blocks following said preamble portion, said preamble portion containing preamble data at a predetermined position in the preamble portion and each of said data blocks containing at least a block synchronizing code, a block identification code, information data and an error correction code for said block identification code and said information data, a device for locating the position of said preamble data, comprising:

means for detecting said block synchronizing code;

means for locating said block identification code on the basis of a time at which said block synchronizing code was detected;

means for reading said located block identification code;

error correcting means for effecting error correction, according to said error correction code, of the block identification code which is read and outputting a corrected block identification code; and means for determining the position of said preamble data on the basis of said corrected block identification code and the time at which said block synchronizing code was detected.

3. In an information transmitting apparatus for transmitting a plurality of sets of information signals, wherein each of said sets includes a preamble portion and a plurality of data blocks following said preamble portion, said preamble portion containing preamble data at a predetermined position in the preamble portion and each of said data blocks containing at least a block synchronizing code, a block identification code and information data, a device for locating the position of said preamble data, comprising:

write address generating means for generating write addresses;

read address generating means for generating read addresses;

memory means for sequentially storing said information signals in accordance with said write addresses and for sequentially outputting said information signals in accordance with said read addresses;

means for detecting said block synchronizing code;

address storing means for storing a write address corresponding to each said block synchronizing code which is detected;

means for reading out said block identification code from said memory means on the basis of a time at which said block synchronizing code was detected; and address calculating means for calculating an address corresponding to said preamble data on the basis of said write address stored in said address storing means and the block identification code which is read out.

4. In an information transmitting apparatus for transmitting a plurality of sets of information signals, wherein each of said sets includes a preamble portion and a plurality of data blocks following said preamble portion, said preamble portion containing preamble data at a predetermined position in the preamble portion and each of said data blocks containing at least a block synchronizing code, a block identification code and information data, a method of locating the position of said preamble data comprising the steps of:

detecting said block synchronizing code;

locating said block identification code on the basis of a position at which said block synchronizing code was detected;

reading said located block identification code; and determining the position of said preamble data on the basis of the block identification code which is read and said position at which said block synchronizing code was detected.

* * * * *